(12) United States Patent
Hwang et al.

(10) Patent No.: US 11,998,963 B2
(45) Date of Patent: Jun. 4, 2024

(54) REACTOR CLEANING APPARATUS AND REACTOR CLEANING METHOD

(71) Applicant: LG CHEM, LTD., Seoul (KR)

(72) Inventors: Moon Sub Hwang, Daejeon (KR); Jeong Seok Lee, Daejeon (KR); Jong Hun Song, Daejeon (KR); You Na Kim, Daejeon (KR); Hong Min Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/296,906

(22) PCT Filed: Aug. 7, 2020

(86) PCT No.: PCT/KR2020/010462
§ 371 (c)(1),
(2) Date: May 25, 2021

(87) PCT Pub. No.: WO2021/118007
PCT Pub. Date: Jun. 17, 2021

(65) Prior Publication Data
US 2022/0055081 A1    Feb. 24, 2022

(30) Foreign Application Priority Data

Dec. 9, 2019    (KR) .................. 10-2019-0162689

(51) Int. Cl.
*B08B 9/093*    (2006.01)
*B08B 9/087*    (2006.01)
*B08B 9/34*     (2006.01)

(52) U.S. Cl.
CPC .............. *B08B 9/093* (2013.01); *B08B 9/087* (2013.01); *B08B 9/34* (2013.01); *B08B 2209/08* (2013.01)

(58) Field of Classification Search
CPC ........... B08B 9/093; B08B 9/087; B08B 9/34; B08B 2209/08
See application file for complete search history.

(56) References Cited

U.S. PATENT DOCUMENTS 548,138    A  *  10/1895  Prather ................. B08B 9/0933
                                                    210/532.1
3,542,593  A  *  11/1970  Pribbernow ............ B08B 9/093
                                                    239/722
(Continued)

FOREIGN PATENT DOCUMENTS

CN    205570301 U    9/2016
CN    205815686 U    12/2016
(Continued)

*Primary Examiner* — Joseph L. Perrin
*Assistant Examiner* — Irina Graf
(74) *Attorney, Agent, or Firm* — Bryan Cave Leighton Paisner LLP

(57) ABSTRACT

The present disclosure provides a reactor cleaning apparatus including: a fixing part having a partial region inserted into a hole formed in an upper portion of a reactor to be coupled to the reactor and fixing a pipe; the pipe inserted into a hole formed in the fixing part, protruding downward from the fixing part, and having a length adjustable in a vertical direction; a spray nozzle provided at a lower end of the pipe; and a screener provided on a lower side surface of the pipe, and a reactor cleaning method using the same.

7 Claims, 1 Drawing Sheet

(56) References Cited

U.S. PATENT DOCUMENTS

| | | | | |
|---|---|---|---|---|
| 3,808,631 | A * | 5/1974 | Shibata | B08B 9/0933 15/409 |
| 4,039,351 | A * | 8/1977 | Butler | B08B 9/093 134/102.1 |
| 4,210,976 | A | 7/1980 | Apelt et al. | |
| 4,220,170 | A * | 9/1980 | Hebert | B63B 57/02 239/165 |
| 4,231,132 | A * | 11/1980 | Watanabe | B08B 9/087 15/56 |
| 4,500,492 | A | 2/1985 | Yamakawa | |
| 4,501,522 | A * | 2/1985 | Causer | B25J 17/0283 414/718 |
| 4,509,701 | A * | 4/1985 | Jack | B65D 88/08 15/104.067 |
| 4,827,563 | A * | 5/1989 | Gordon | B08B 9/0933 15/93.1 |
| 4,941,493 | A * | 7/1990 | Wieringa | B08B 9/093 134/182 |
| 5,293,887 | A * | 3/1994 | Thibodeaux | B08B 9/093 239/743 |
| 5,301,702 | A | 4/1994 | McKinney | |
| 5,503,033 | A * | 4/1996 | Van Niekerk | B08B 9/093 73/865.8 |
| 5,762,467 | A * | 6/1998 | Sturm, Jr. | B25J 18/025 414/718 |
| 5,776,257 | A * | 7/1998 | Arnold | B08B 9/0933 134/21 |
| 6,145,517 | A * | 11/2000 | Mancuso | B66C 13/08 414/209 |
| 6,213,134 | B1 * | 4/2001 | Pike | B60S 3/008 134/169 R |
| 6,285,919 | B1 * | 9/2001 | Randolph | B08B 9/08 700/275 |
| 7,261,109 | B2 * | 8/2007 | Luke | B08B 9/0933 134/167 R |
| 10,786,905 | B1 * | 9/2020 | Innes | B25J 11/0085 |
| 2004/0134518 | A1 * | 7/2004 | Kraus | B01J 8/0025 15/302 |
| 2008/0185400 | A1 * | 8/2008 | Griffith | B08B 7/02 222/196 |
| 2008/0257246 | A1 * | 10/2008 | Griffith | B63B 57/02 114/221 R |
| 2011/0315164 | A1 * | 12/2011 | DesOrmeaux | B08B 9/0933 15/300.1 |
| 2013/0000672 | A1 * | 1/2013 | Bovio | C23C 16/4407 134/8 |
| 2013/0269730 | A1 | 10/2013 | McGregor et al. | |
| 2014/0326327 | A1 * | 11/2014 | Owen | B65D 90/54 137/15.07 |
| 2017/0259309 | A1 * | 9/2017 | Innes | B05B 13/0636 |
| 2017/0316844 | A1 * | 11/2017 | Riesenweber | B08B 9/0933 |
| 2017/0326737 | A1 * | 11/2017 | Martin | B25J 18/025 |
| 2018/0087490 | A1 * | 3/2018 | Fraughton | B08B 3/024 |
| 2019/0201947 | A1 * | 7/2019 | Jansen | B01J 8/0035 |
| 2020/0055102 | A1 * | 2/2020 | Liu | H01L 21/6719 |

FOREIGN PATENT DOCUMENTS

| | | |
|---|---|---|
| CN | 205816274 U | 12/2016 |
| CN | 207385452 U | 5/2018 |
| CN | 108905246 A | 11/2018 |
| JP | 2002-355697 A | 12/2002 |
| KR | 10-2013-0132533 A | 12/2013 |
| KR | 10-2015-0080780 A | 7/2015 |
| KR | 10-1833908 B1 | 3/2018 |
| KR | 10-2018-0113628 A | 10/2018 |
| WO | 2009074958 A1 | 6/2009 |

\* cited by examiner

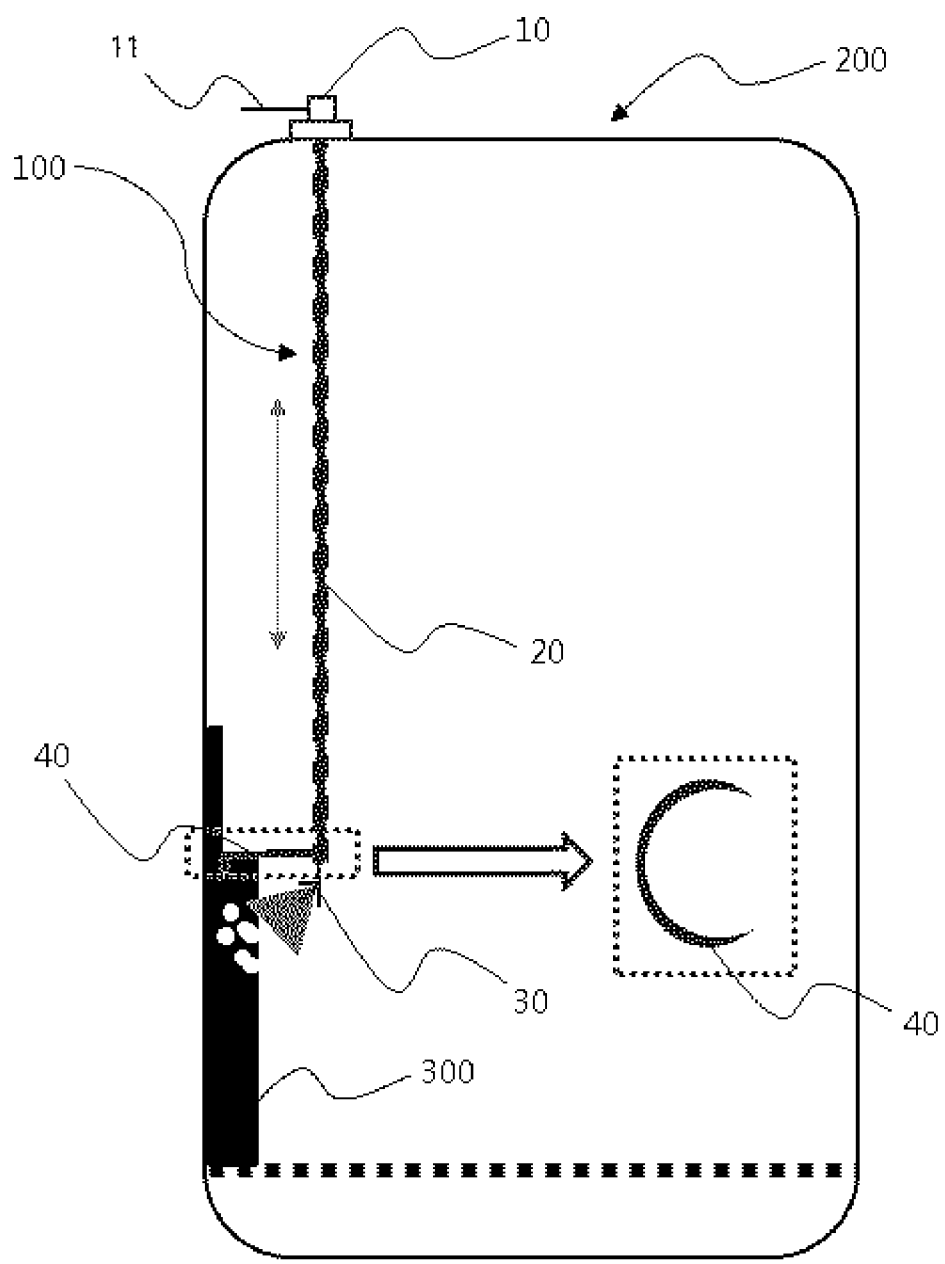

REACTOR CLEANING APPARATUS AND REACTOR CLEANING METHOD

CROSS-REFERENCE TO RELATED APPLICATIONS

The present application is a National Phase entry pursuant to 35 U.S.C. § 371 of International Application No. PCT/KR2020/010462, filed on Aug. 7, 2020, and claims the benefit of and priority to Korean Patent Application No. 10-2019-0162689, filed on Dec. 9, 2019, the disclosures of which are incorporated by reference in their entirety for all purposes as if fully set forth herein.

TECHNICAL FIELD

The present invention relates to a reactor cleaning apparatus, and more particularly, to a reactor cleaning apparatus and a reactor cleaning method that are capable of removing fouling occurring on an inner wall of a reactor when producing an oligomer of ethylene.

BACKGROUND ART

An alpha olefin is an important substance used for a comonomer, a cleaner, a lubricant, a plasticizer, or the like, and has been used commercially widely used. In particular, 1-hexene and 1-octene have been frequently used as a comonomer to control a density of polyethylene when producing linear low-density polyethylene (LLDPE).

The alpha olefin such as 1-hexene or 1-octene typically has been produced through an oligomerization reaction of ethylene. The oligomerization reaction of ethylene is performed through an oligomerization reaction (a trimerization reaction or a tetramerization reaction) of ethylene in the presence of a catalyst using ethylene as a reactant. As a product produced through the reaction, a small amount of each of wax and a polymer substance is produced during a catalytic reaction, in addition to a multi-component hydrocarbon mixture containing a desired 1-hexene and 1-octene. These substances adhere to and are accumulated on the inner wall of the reactor in a certain thickness, and in this case, an operation of the reactor is required to be shut down and chemically cleaned at a high temperature. Thus, a production amount is reduced due to a reduction in operation time, and time and costs required in a cleaning process increase.

Accordingly, in the related art, the reactor is cleaned by a method of chemically cleaning the reactor at a high temperature with a solvent having a high temperature to remove the contaminants (the wax, the polymer, and the like) accumulated in the reactor. However, in this case, as it takes a long time to completely remove the contaminants (the wax, the polymer, and the like) fouled on the inner wall of the reactor, it is difficult to quickly shift to a normal process mode.

DISCLOSURE

Technical Problem

In order to solve the problems mentioned in the background art, an object of the present invention is to provide a reactor cleaning apparatus and a reactor cleaning method that are capable of physically cleaning a reactor by performing solvent spray and dislodgment with the use of a screener on a contaminant generated in the reactor at the same time in a state where the reactor is closed.

Technical Solution

In one general aspect, a reactor cleaning apparatus includes: a fixing part having a partial region inserted into a hole formed in an upper portion of a reactor to be coupled to the reactor and fixing a pipe; the pipe inserted into a hole formed in the fixing part, protruding downward from the fixing part, and having a length adjustable in a vertical direction; a spray nozzle provided at a lower end of the pipe; and a screener provided on a lower side surface of the pipe.

In another general aspect, a reactor cleaning method includes: inserting a partial region of each of a plurality of fixing parts of a reactor cleaning apparatus into each of a plurality of holes formed along a circumference of an upper portion of a reactor to couple the reactor and the reactor cleaning apparatus to each other; spraying a solvent toward a contaminant accumulated on an inner wall of the reactor using a spray nozzle provided at a lower end of a pipe inserted into a hole formed in the fixing part of the reactor cleaning apparatus; dislodging the contaminant accumulated on the inner wall of the reactor using a screener provided on a lower side surface of the pipe while vertically moving the pipe from an upper portion to a lower portion of the reactor by adjusting a length of the pipe of the reactor cleaning apparatus; and removing the dislodged contaminant from the reactor.

Advantageous Effects

According to the reactor cleaning apparatus and method, the reactor is physically cleaned in a short time by performing the solvent spray and the dislodgment with the use of the screener on the contaminant generated in the reactor at the same time, such that a time to open the reactor and perform chemical cleaning at a high temperature with a solvent having a high temperature can be effectively reduced.

Further, according to the present invention, the reactor is cleaned in a closed state rather than in a state where the reactor is separated or opened, such that a time to normalize the reaction after the cleaning can be shortened and reaction stability can be improved.

Further, according to the present invention, the cleaning time of the reactor is shortened, such that problems such as a reduction in production amount occurring during operation shut-down for cleaning and an increase in cleaning cost can be solved.

DESCRIPTION OF DRAWINGS

FIG. 1 is a schematic view illustrating a reactor cleaning method using a reactor cleaning apparatus according to an exemplary embodiment of the present invention.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

The term "stream" in the present invention may refer to a flow of a fluid in a process, and may also refer to a fluid flowing through a transfer line (pipe) itself. Specifically, the "stream" may refer to both the fluid flowing through the pipe connecting respective devices to each other itself and the flow of the fluid at the same time. In addition, the fluid may refer to gas or liquid.

The term "C#" in which "#" is a positive integer in the present invention refers to all hydrocarbons having # carbon atoms. Accordingly, the term "C10" refers to a hydrocarbon compound having 10 carbon atoms. In addition, the term "C#+" refers to all hydrocarbon molecules having # or more carbon atoms. Accordingly, the term "C10+" refers to a mixture of hydrocarbons having 10 or more carbon atoms.

Hereinafter, the present invention will be described in more detail with reference to FIG. 1 for assisting in understanding the present invention.

According to the present invention, there is provided a reactor cleaning apparatus 100 including: a fixing part 10 having a partial region inserted into a hole formed in an upper portion of a reactor 200 to be coupled to the reactor 200 and fixing a pipe 20; the pipe 20 inserted into a hole formed in the fixing part 10, protruding downward from the fixing part 10, and having a length adjustable in a vertical direction; a spray nozzle 30 provided at a lower end of the pipe 20; and a screener 40 provided on a lower side surface of the pipe 20.

According to an exemplary embodiment of the present invention, the reactor 200 can be a reactor suitable for a continuous process. Examples of the reactor 200 can include one or more reactors selected from the group consisting of a continuous stirred-tank reactor, a plug flow reactor, and a bubble column reactor.

According to an exemplary embodiment of the present invention, the reactor 200 is used for an oligomerization reaction of ethylene. Specifically, a monomer stream containing an ethylene monomer is fed to the reactor 200 and subjected to the oligomerization reaction, and thus, a desired alpha olefin product can be produced. In this case, the oligomerization reaction can be performed in a lower or middle region of the reactor 200. The oligomerization reaction of the ethylene monomer can be performed in a liquid state in which the ethylene monomer is dissolved in a solvent in the presence of a catalyst or a cocatalyst. The oligomerization reaction can refer to a polymerization reaction of a small amount of ethylene monomers. The polymerization reaction is called trimerization or tetramerization depending on the number of ethylene monomers to be polymerized, and these polymerization reactions are collectively referred to as multimerization.

The alpha olefin is an important substance used for a comonomer, a cleaner, a lubricant, a plasticizer, or the like, and has been used commercially widely used. In particular, 1-hexene and 1-octene have been frequently used as a comonomer to control a density of polyethylene when producing linear low-density polyethylene (LLDPE). The alpha olefin such as 1-hexene or 1-octene can be produced, for example, through a trimerization reaction or tetramerization reaction of an ethylene monomer.

According to an exemplary embodiment of the present invention, the oligomerization reaction of the ethylene monomer can be performed by a homogeneous liquid phase reaction in the presence or absence of a solvent, a slurry reaction in which a catalyst is partially dissolved or not entirely dissolved, a two phase liquid/liquid reaction, a bulk reaction in which a product acts as a main medium, or a gas phase reaction, by applying the above reaction system and a general contact technology.

The catalyst can include a transition metal source. Examples of the transition metal source can be a compound containing one or more selected from the group consisting of chromium(III) acetylacetonate, chromium(III) chloride tetrahydrofuran, chromium(III) 2-ethylhexanoate, chromium (III) tris(2,2,6,6-tetramethyl-3,5-heptanedionate), chromium (III) benzoylacetonate, chromium(III) hexafluoro-2,4-pentanedionate, chromium(III) acetate hydroxide, chromium(III) acetate, chromium(III) butyrate, chromium (III) pentanoate, chromium(III) laurate, and chromium(III) stearate.

Examples of the cocatalyst can include one or more selected from the group consisting of trimethylaluminium, triethylaluminium, triisopropylaluminium, triisobutylaluminum, ethylaluminum sesquichloride, diethylaluminum chloride, ethylaluminium dichloride, methylaluminoxane, modified methylaluminoxane, and borate.

As such, in the oligomerization process of the ethylene monomer in the presence of the catalyst and the solvent, by-products such as wax and a polymer such as C20+ are produced in addition to an oligomer product. In a case where these by-products are discharged together with the oligomer product through a pipe, a contaminant 300 is accumulated on the inner wall of the reactor 200 and a member included in the reactor 200 in a certain thickness due to adhesion of the polymer. As a result, it is required to shut down an operation of the reactor 200 and to clean the inside of the reactor 200. As a cleaning method of the reactor 200, in the related art, the reactor 200 is cleaned by a method of chemically cleaning a reactor at a high temperature with a solvent having a high temperature to remove the contaminant 300 accumulated in the reactor 200. However, in this case, the cleaning effect is excellent, but thermal stress is generated in the reactor 200 and the reactor 200 is required to be open for a long time in accordance with a long cleaning time.

On the other hand, the present invention provides the reactor cleaning apparatus 100 and a reactor cleaning method that are capable of physically cleaning the reactor 200 in a short time by performing solvent spray with the use of the spray nozzle 30 and dislodgment with the use of the screener 400 on the contaminant 300 generated in the reactor 200 at the same time in a state where the reactor 200 is closed without opening the reactor 200. By this configuration, the time to open the reactor 200 and perform chemical cleaning at a high temperature with a solvent having a high temperature is effectively reduced, such that problems such as a reduction in production amount occurring during operation shut-down for cleaning and an increase in cleaning cost can be solved. Thus, a time to normalize the reaction after the cleaning can be shortened and reaction stability can be improved.

According to an exemplary embodiment of the present invention, the reactor cleaning apparatus 100 can include the fixing part 10 having the partial region inserted into the hole formed in the upper portion of the reactor 200 to be coupled to the reactor 200 and fixing the pipe 20.

The partial region of the fixing part 10 can be inserted into the hole formed in the upper portion of the reactor 200, and the remaining region of the fixing part 10 can protrude from the upper portion of the reactor 200. An outer circumference of the fixing part 10 protruding from the upper portion of the reactor 200 can be greater than that of the hole formed in the upper portion of the reactor 200. Accordingly, a lower portion of the outer circumference of the protruding fixing part 10 can be seated on a periphery of the hole formed in the upper portion of the reactor 200 to stably fix the reactor cleaning apparatus 100 to the upper portion of the reactor 200.

The hole is formed in the fixing part 10, and a pipe 20 to be described below can be inserted into and fixed to the hole. In this case, the hole formed in the fixing part 10 can be formed in the center of the fixing part 10.

According to an exemplary embodiment of the present invention, the reactor cleaning apparatus 100 can include the pipe 20 inserted into the hole formed in the fixing part 10, protruding downward from the fixing part 10, and having the length adjustable in the vertical direction.

The pipe 20 can be a winding-up type. For example, the pipe 20 is composed of multiple-stage pipes overlapped in a layer form at intervals of about 10 cm to 50 cm. The length of the pipe 20 can be adjusted in the vertical direction by extension or folding using a control part 11 provided in the fixing part 10. As such, since the winding-up type pipe 20 in which the multiple-stage pipes are overlapped in the layer form can be used in a firmly fixed state as compared with a roll type pipe of which a length is adjusted by winding or unwinding a long pipe, the screener 40 or the like can be stably operated without being affected by a vibration generated during the cleaning performed by spraying the solvent having a high temperature and a high pressure.

The pipe 20 can be inserted into the hole formed in the fixing part 10 while vertically penetrating the hole. The pipe 20 can have an outer diameter so that the pipe 20 is tightly fitted to an outer circumferential surface of the hole formed in the fixing part 10 so as to prevent shaking thereof.

An inner structure of the pipe 20 is not particularly limited as long as it does not inhibit a flow of a fluid. The pipe 20 can allow the solvent to transfer to a spray nozzle 30 provided at the lower end of a pipe 20 to be described below, as the fluid is transferred from an upper portion to the lower portion of the pipe 20. In this case, any material can be used for the pipe 20 used in the art as long as it is not corroded by the solvent.

In addition, the pipe 20 can be used as a means for vertically moving a screener 40 to be described below.

According to an exemplary embodiment of the present invention, the reactor cleaning apparatus 100 can include the control part 11 for vertically moving the pipe 20. In this case, the control part 11 can be coupled to the fixing part 10. A structure and an operation type of the control part 11 are not particularly limited as long as the pipe 20 is vertically moved by the control part 11.

For example, the control part 11 can include a knob for vertically moving the pipe 20. Specifically, in order to downwardly extend the pipes overlapped in the multiple-stage form from the reactor 200, the multiple-stage pipes can be extended one by one from the pipe having the largest circumference using the knob. On the contrary, the pipe downwardly extending from the reactor can be moved toward the upper portion of the reactor 200 by folding the multiple-stage pipes one by one from the pipe having the smallest circumference.

According to an exemplary embodiment of the present invention, the reactor cleaning apparatus 100 can include the spray nozzle 30 provided at the lower end of the pipe 20. The solvent fed from the pipe 20 can be sprayed through the spray nozzle 30. In this case, the spray nozzle 30 can spray the solvent having a high pressure to swell and partially dislodge the contaminant 300 accumulated on the inner wall of the reactor 200 at the same time. To this end, the spray nozzle 30 can be provided to spray the solvent toward the inner wall of the reactor 200.

The reactor cleaning apparatus 100 can further include a nozzle pipe connecting the spray nozzle 30 and the pipe 20 to each other. Specifically, the solvent transferred through the pipe 20 can be supplied to the spray nozzle 30 through the nozzle pipe and can be sprayed through the spray nozzle 30.

A spray angle of the solvent sprayed from the spray nozzle 30 can be 90° or less. The spray angle of the solvent sprayed from the spray nozzle 30 can be, for example 0° to 90°, 10° to 90°, or 20° to 80°. When the solvent is sprayed at the spray angle within the above ranges, the solvent can be sprayed to a desired region at a high pressure, such that the contaminant 300 accumulated in the corresponding region can be effectively removed.

In addition, the number of the spray nozzles 30, an angle of each nozzle, a length of the nozzle pipe, and the like can be adjusted in various forms in accordance with various environments in which the present invention is implemented.

According to an exemplary embodiment of the present invention, the reactor cleaning apparatus 100 can include the screener 40 provided on the lower side surface of the pipe 20.

The screener 40 can protrude toward the inner wall of the reactor 200 from the pipe 20. Specifically, the screener 40 can protrude toward the inner wall of the reactor 200 from the pipe 20 to scrape and remove the contaminant 300 accumulated on the inner wall of the reactor 200.

A partial region of the screener 40 can have a curve corresponding to the inner wall of the reactor 200. Specifically, the screener 40 can be provided on the lower side surface of the pipe 20, and in this case, the partial region except that a portion coupled to the pipe 20 can have a curve corresponding to the inner wall of the reactor 200. As such, the screener 40 has the curve corresponding to the inner wall of the reactor 200 to effectively scrape the contaminant 300 accumulated on the inner wall of the reactor 200 having a curve.

The screener 40 can be formed in a thin wire form by using a material having high strength. For example, the screener 40 can be formed of a metal material. Specifically, the screener 40 can be formed of stainless steel (SUS) which can withstand a high-temperature and high-pressure cleaning environment and is less likely to be corrosive.

The screener 40 can be provided on the lower side surface of the pipe 20, and can also be provided at a position higher than the lower end of the pipe 20 at which the spray nozzle 30 is formed. By this configuration, the screener 40 can swell the contaminant 300 accumulated on the inner wall of the reactor 200 with the solvent sprayed through the spray nozzle 30 and can easily scrape the swollen contaminant 300 using the screener 400, while moving the pipe 20 downwards.

A direction in which the screener 40 protrudes and a direction in which the spray nozzle 30 is directed can be the same as each other. Specifically, both the direction in which the screener 40 protrudes and the direction in which the spray nozzle 30 is directed can be a direction toward the inner wall of the reactor 200. By this configuration, the contaminant 300 accumulated on the inner wall of the reactor 200 can be swollen and partially dislodged with the solvent sprayed from the spray nozzle 30 as the pipe 20 moves from the upper portion to the lower portion of the reactor 200, and the screener 40 provided at the position higher than the spray nozzle 30 can easily scrape the swollen contaminant 300, thereby cleaning the contaminant 300 accumulated on the inner wall of the reactor 200.

According to an exemplary embodiment of the present invention, the reactor cleaning apparatus 100 can further include required devices such as a valve (not illustrated), a condenser (not illustrated), a reboiler (not illustrated), a pump (not illustrated), a separation device (not illustrated), a compressor (not illustrated), and a mixer (not illustrated), if necessary.

According to the present invention, there is provided a reactor cleaning method. The reactor cleaning method can include: inserting a partial region of each of a plurality of fixing parts 10 of a reactor cleaning apparatus 100 into each of a plurality of holes (not illustrated) formed along a circumference of an upper portion of a reactor 200 to couple the reactor 200 and the reactor cleaning apparatus 100 to each other; spraying a solvent toward a contaminant 300 accumulated on an inner wall of the reactor 200 using a spray nozzle 30 provided at a lower end of a pipe 20 inserted into a hole formed in the fixing part 10 of the reactor cleaning apparatus 100; dislodging the contaminant 300 accumulated on the inner wall of the reactor 200 using a screener 40 provided on a lower side surface of the pipe 20 while vertically moving the pipe 20 from an upper portion to a lower portion of the reactor 200 by adjusting a length of the pipe 20 of the reactor cleaning apparatus 100; and removing the dislodged contaminant 300 from the reactor 200.

According to an exemplary embodiment of the present invention, the reactor cleaning apparatus 100 used in the reactor cleaning method can be the reactor cleaning apparatus 100 described above.

According to an exemplary embodiment of the present invention, the inserting of the partial region of each of the plurality of fixing parts 10 of the reactor cleaning apparatus 100 into each of the plurality of holes formed along the circumference of the upper portion of the reactor 200 to couple the reactor 200 and the reactor cleaning apparatus 100 to each other can be a step of preparing cleaning of the reactor 200.

The reactor cleaning apparatus 100 can be fixed by inserting the partial region of each of the fixing parts 10 of the reactor cleaning apparatus 100 into the plurality of holes formed along the circumference of the upper portion of the reactor 200, and the hole can have a diameter sufficient to allow the pipe 20 connected to the fixing part 10 to move in a vertical direction.

In addition, the plurality of holes formed along the circumference of the upper portion of the reactor 200 can be designed by easily changing the number of holes depending on a size of the reactor 200. FIG. 1 illustrates cleaning of the inner wall of the reactor 200 by inserting a single reactor cleaning apparatus 100 into the hole formed in the upper portion of the reactor 200, but is provided for illustration only. Each of the number of the holes formed along the circumference of the upper portion of the reactor 200 and the number of the reactor cleaning apparatuses 100 coupled to the holes, respectively, can be 3 or more. For example, each of the number of the holes formed along the circumference of the upper portion of the reactor 200 and the number of the reactor cleaning apparatuses 100 coupled to the holes, respectively, can be 3 to 20, 3 to 15, or 4 to 10.

As such, in a case where the inside of the reactor 200 is cleaned using a plurality of reactor cleaning apparatuses 100 corresponding to the plurality of holes formed along the circumference of the upper portion of the reactor 200, respectively, the reactor cleaning apparatuses 100 can be selectively installed without interference with a position of a thermometer or a pressure gauge that is generally installed by penetrating a side surface of the reactor 200. Thus, for the cleaning of the reactor 200, it is not required to disassemble an additional installation of the thermometer or the pressure gauge installed in the reactor.

In addition, the plurality of holes formed along the circumference of the upper portion of the reactor 200 can be closed by a separate opening and closing part during the operation of the reactor 200.

According to an exemplary embodiment of the present invention, the spraying of the solvent toward the contaminant 300 accumulated on the inner wall of the reactor 200 using the spray nozzle 30 provided at the lower end of the pipe 20 inserted into the hole formed in the fixing part 10 of the reactor cleaning apparatus 100 can be a step of swelling or partially dislodging the contaminant 300 accumulated on the inner wall of the reactor 200.

In this case, as described above, the spray nozzle 30 can be provided at the lower end of the pipe 20 inserted into the hole formed in the fixing part 10 of the reactor cleaning apparatus 100, and can be formed to face the inner wall of the reactor 200.

As such, the solvent is sprayed from the spray nozzle formed to face the inner wall of the reactor 200 on which the contaminant 300 is accumulated, such that the contaminant 300 can be swollen and partially dislodged.

In addition, as described above, the solvent sprayed from the spray nozzle 30 is sprayed at a spray angle of 90° or less, such that the contaminant 300 accumulated in a desired region can be effectively swollen.

A pressure of the solvent sprayed through the spray nozzle 30 can be 10 bar·g to 100 bar·g. For example, the pressure of the solvent sprayed through the spray nozzle 30 can be 30 bar·g to 100 bar·g, 50 bar·g to 100 bar·g, or 50 bar·g to 80 bar·g. When the solvent is sprayed at the spray pressure within the above ranges, the contaminant 300 accumulated on the inner wall of the reactor 200 can be effectively swollen and partially dislodged. In addition, in a case where the contaminant 300 is swollen by spraying the solvent having a high pressure through the spray nozzle 30, the contaminant 300 can be easily dislodged using a screener 40 to be described below.

The solvent sprayed through the spray nozzle 30 can include one or more selected from the group consisting of n-pentane, n-hexane, n-heptane, cyclohexane, methylcyclohexane, octane, cyclooctane, decane, dodecane, benzene, xylene, 1,3,5-trimethylbenzene, toluene, ethylbenzene, chlorobenzene, dichlorobenzene, and trichlorobenzene. As a specific example, the solvent can include n-hexane, cyclohexane, and toluene. The solvent is a material having high solubility with respect to a contaminant. The contaminant accumulated on the inner wall of the reactor 200 can be swollen with the solvent to facilitate the dislodgment of the contaminant using a screener to be described below.

For example, in a case where the reactor 200 is used for the oligomerization reaction of ethylene, the contaminant 300 accumulated on the inner wall of the reactor 200 can be a polymer substance of ethylene. In this case, when the solvent is sprayed to the contaminant 300, the polymer substance accumulated on the inner wall of the reactor 200 can be more effectively swollen.

A temperature of the solvent sprayed through the spray nozzle 30 can be 10° C. to 100° C. For example, the temperature of the solvent can be 10° C. to 80° C., 20° C. to 60° C., or 20° C. to 40° C. When the solvent having the temperature within the above ranges is sprayed to the contaminant 300, the contaminant 300 can be effectively swollen to facilitate the scraping and dislodgment of the contaminant using the screener 40.

According to an exemplary embodiment of the present invention, the dislodging of the contaminant 300 accumulated on the inner wall of the reactor 200 using the screener 40 provided on the lower side surface of the pipe while vertically moving the pipe 20 from the upper portion to the lower portion of the reactor 200 by adjusting the length of the pipe 20 of the reactor cleaning apparatus 100 can be a step of scraping and physically dislodging the contaminant 300 sufficiently swollen with the solvent spray using the screener 40.

According to an exemplary embodiment of the present invention, the spraying of the solvent toward the contaminant 300 accumulated on the inner wall of the reactor 200 using the spray nozzle 30 provided at the lower end of the pipe 20 inserted into the hole formed in the fixing part 10 of the reactor cleaning apparatus 100 and the dislodging of the contaminant 300 accumulated on the inner wall of the reactor 200 using the screener 40 provided on the lower side surface of the pipe 20 while vertically moving the pipe 20 from the upper portion to the lower portion of the reactor 200 by adjusting the length of the pipe 20 of the reactor cleaning apparatus 100 can be performed at the same time.

As described above, in the reactor cleaning method according to the present invention, the solvent spray with the use of the spray nozzle 30 and the physical dislodgment with the use of the screener 40 with respect to the contaminant 300 accumulated on the inner wall of the reactor 200 are performed at the same time, such that a cleaning time can be reduced and the contaminant 300 can be effectively removed.

According to an exemplary embodiment of the present invention, the reactor cleaning method can be performed in a state where the reactor is closed. By this configuration, the time to open the reactor 200 and perform chemical cleaning at a high temperature with the solvent having a high temperature is effectively reduced, such that problems such as a reduction in production amount occurring during operation shut-down for cleaning and an increase in cleaning cost can be solved. Thus, a time to normalize the reaction after the cleaning can be shortened and the reaction stability can be improved.

Hereinabove, the reactor cleaning apparatus and the reactor cleaning method according to the present invention have been described and illustrated in the drawing. However, the description and the illustration of the drawing are for only essential components for understating the present invention, and processes and apparatuses not separately described and illustrated can be properly applicable and used for implementing the reactor cleaning apparatus and the reactor cleaning method, in addition to the processes and apparatuses described and illustrated in the drawing.

The invention claimed is:

1. A reactor cleaning apparatus, comprising:
a fixing part having a partial region inserted into a hole formed in an upper portion of a reactor to be coupled to the reactor and fixing a pipe;
the pipe inserted into a hole formed in the fixing part, protruding downward from the fixing part, and having a length adjustable in a vertical direction;
a control part including a knob that vertically adjust the length of the pipe;
a spray nozzle provided at a lower end of the pipe; and
a scraper provided on a lower side surface of the pipe,
wherein the scraper is formed of a metal material,
wherein the scraper is provided at a position higher than the lower end of the pipe at which the spray nozzle is formed,
wherein the pipe is a winding-up type pipe having multiple-stage pipes overlapped in a layer form and is configured to move only vertically,
wherein the reactor is an ethylene oligomerization reactor selected from the group consisting of a continuous stirred-tank reactor, a plug flow reactor, and a bubble column reactor,
wherein the scraper protrudes toward an inner wall of the reactor from the pipe,
wherein an outer peripheral surface of a region of the scraper protruding toward the inner wall of the reactor has a curve corresponding to a curve of the inner wall of the reactor,
wherein the scraper is configured to dislodge a contaminant accumulated on the inner wall of the reactor by the region of the scraper when the length of the pipe is adjusted by the control part to move the scraper vertically from an upper portion to a lower portion of the reactor, and
wherein the spray nozzle is directed to spray a solvent toward the inner wall of the reactor.

2. The reactor cleaning apparatus of claim 1, wherein a spray angle of a solvent sprayed through the spray nozzle is 90° or less.

3. A reactor cleaning method comprising:
inserting the partial region of the fixing of the reactor cleaning apparatus of claim 1 into the hole formed in the upper portion of the reactor to couple the reactor and the reactor cleaning apparatus to each other;
spraying the solvent toward the contaminant accumulated on the inner wall of the reactor using the spray nozzle provided at the lower end of the pipe inserted into the hole formed in the fixing part of the reactor cleaning apparatus;
dislodging the contaminant accumulated on the inner wall of the reactor using the scraper provided on the lower side surface of the pipe while vertically moving the pipe from the upper portion to the lower portion of the reactor by adjusting the length of the pipe of the reactor cleaning apparatus; and
removing the dislodged contaminant from the reactor.

4. The reactor cleaning method of claim 3, wherein a pressure of the solvent sprayed through the spray nozzle is 10 bar·g to 100 bar·g.

5. The reactor cleaning method of claim 3, wherein the solvent includes one or more selected from the group consisting of n-pentane, n-hexane, n-heptane, cyclohexane, methylcyclohexane, octane, cyclooctane, decane, dodecane, benzene, xylene, 1,3,5-trimethylbenzene, toluene, ethylbenzene, chlorobenzene, dichlorobenzene, and trichlorobenzene.

6. The reactor cleaning method of claim 3, wherein the reactor cleaning method is performed in a state where the reactor is closed.

7. The reactor cleaning method of claim 3, wherein the spraying step and the dislodging step are performed at the same time.

* * * * *